F. S. RICKER.
ANIMAL TRAP.
APPLICATION FILED DEC. 21, 1914.
1,143,589.
Patented June 15, 1915.
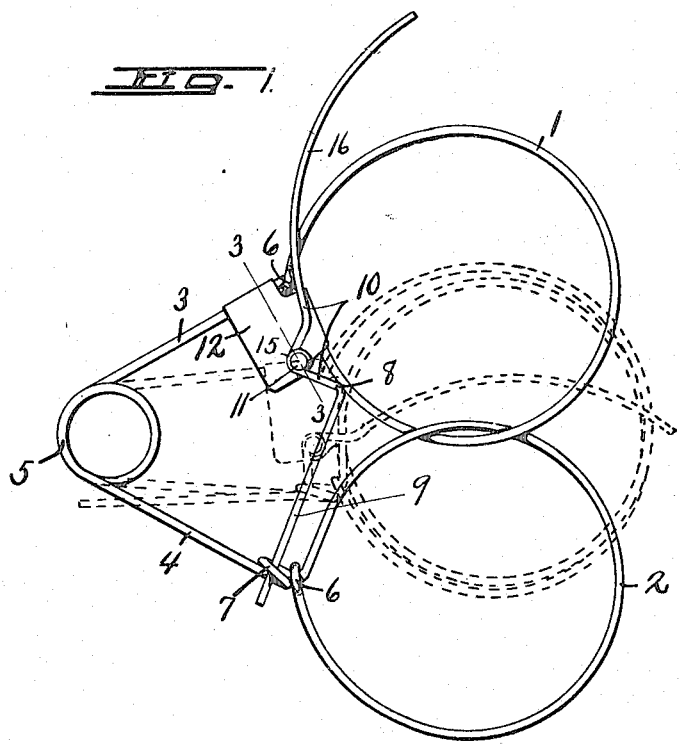
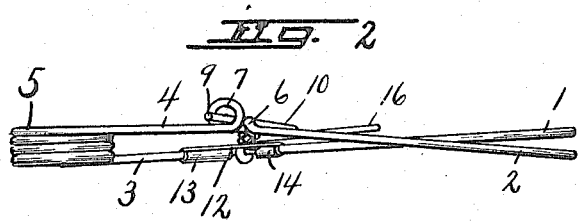
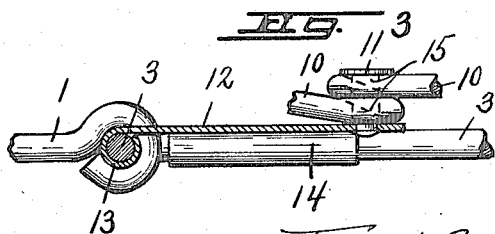
WITNESSES:
INVENTOR
Frank S. Ricker
BY
Howard P. Denison
ATTORNEY.

UNITED STATES PATENT OFFICE.

FRANK S. RICKER, OF ONEIDA CASTLE, NEW YORK, ASSIGNOR TO ONEIDA COMMUNITY, LIMITED, OF ONEIDA, NEW YORK, A CORPORATION OF NEW YORK.

ANIMAL-TRAP.

1,143,589.  Specification of Letters Patent.  Patented June 15, 1915.

Application filed December 21, 1914. Serial No. 878,307.

*To all whom it may concern:*

Be it known that I, FRANK S. RICKER, a citizen of the United States, and resident of Oneida Castle, in the county of Oneida, in the State of New York, have invented new and useful Improvements in Animal-Traps, of which the following, taken in connection with the accompanying drawings, is a full, clear, and exact description.

This invention relates to certain improvements in animal traps, and in the form shown is particularly applicable to that form of trap shown in Letters Patent No. 1,029,087 issued to William Scott, June 11, 1912, and involving the use of interlocking arcuate or ring shaped jaws spring connected to each other and adapted when set against the action of the spring to be held in that position by a suitable detent and trigger.

Experience teaches that when the form of detent shown in the above identified patent is used, persons unfamiliar with the trap become confused and are uncertain as to the manner of setting the same, and further, even those familiar with the trap experience some difficulty in setting it, due to the necessity of engaging the detent with the jaw and with the trigger at the same time that the spring is being compressed.

The primary object of the invention is to simplify the setting mechanism and to eliminate the uncertainty as to the proper manner of setting the trap and minimize the difficulty in accomplishing the same.

Other objects and uses will appear from the following description, taken in connection with the accompanying drawings, in which—

Figure 1 is a top plan view of an animal trap embodying the various features of my invention, said trap being shown in open position by full lines and in its set position by dotted lines. Fig. 2 is a side elevation of the trap illustrated in Fig. 1. Fig. 3 is an enlarged transverse sectional view taken on line 3—3, Fig. 1.

This trap comprises a pair of circular jaws or rings —1— and —2— having spring arms —3— and —4— projecting laterally from one side thereof and united at their outer ends some distance from the rings —1— and —2— by a coiled spring —5—, the arms —3— and —4— and coiled spring being tensioned so as to normally tend to force the rings apart or from their superposed set positions.

The rings —1— and —2— and their arms —3— and —4— together with the coiled spring —5— are preferably disposed in nearly the same plane at right angles to the axes of the rings and are formed from a single piece of spring wire of suitable gage, the arms —3— and —4— being substantially straight and located just at the outside of a direct line drawn between the centers of the rings and the center of the coil —5—, thereby forming comparatively sharp angles at their junctions with said rings. The coil —5— is made from the intermediate portions of the wire, while the arms —3— and —4— are extended tangentially to the coil and their ends are bent in the form of circles to form the jaws —1— and —2— and terminate in eyes —6— which are looped around and interlock with the junctions of the arms with the rings, thereby maintaining the circular forms of the rings. The arm —4— near its junction with the corresponding ring jaw —2— is bent into the form of a loop —7— for interlocking engagement with the detent portion —8— of a setting lever —9—. The lever —9— is of sufficient length to normally lie in the loop —7— when the trap is in open position, thereby eliminating any uncertainty as to the proper manner of setting the trap.

As shown, the lever —9— in connection with which the detent —8— is formed, comprises a piece of wire —10— of suitable gage movably mounted upon a post —11— supported by a plate —12— preferably made of sheet metal and having its outer side and inner end bent in the form of eyes —13— and —14— embracing the arm —3— and the adjacent portion of the ring —1—, respectively. Preferably, as shown, the intermediate portion of the wire —10— is formed with an eye or loop —15— mounted upon the post —11— for relative rotary movement, and the projecting portion —16— of the wire forms a trigger of sufficient length to extend across the intermediate portions of the rings —1— and —2— in their superposed set position.

With this construction, the trigger, detent and setting lever are formed of a single piece of wire and the setting of the trap is accomplished preferably by compressing the spring arms somewhat by hand, then grasping the end of the lever —9— which projects outwardly from the loop —7— and utilizing the same to further compress the spring arms —3— and —4— until the detent —8— is brought into interlocking engagement with the loop —7— to hold the trap in set position until released by movement of the trigger —16—.

Although I have shown and described one construction and arrangement for attaining the advantages above set forth, I do not desire to limit myself to any particular form or arrangement of the parts, as many changes may be made in the details of construction, arrangement and operation without departing from the spirit of this invention as set forth in the appended claims, and I desire to claim herein a trap setting lever adapted to be used in compressing the actuating means for the jaws of a trap and for bringing a detent, engaged with one jaw or its actuating or mounting means, into interlocking engagement with the other jaw or its actuating or mounting means to hold the trap in set position.

I also desire to claim a trigger, detent and lever formed of a single piece of material, preferably metal, having its intermediate portion movably mounted upon one jaw or its supporting or actuating means, and having one end adapted to form a detent and a lever for bringing the detent into engagement with the opposite jaw or its supporting or actuating means, and having the other end forming a trigger adapted to extend across the opening in the rings when they are in superposed set position, and I desire it understood that in the claims hereto appended the term jaws is deemed to include the spring arms —3— and —4— or such other supporting or actuating means as may be provided for supporting or controlling the action of the rings —1— and —2—.

What I claim is:

1. An animal trap comprising co-acting jaws, a trigger, a detent engaged with one of said jaws, said detent provided with an extension adapted to engage the opposite jaws and forming a lever for compressing the jaws and bringing the detent into interlocking engagement with said opposite jaw.

2. An animal trap comprising co-acting jaws, a trigger, a detent engaged with one of said jaws, said detent provided with an extension, the opposite jaw provided with an eye, said extension of the detent adapted to be normally seated in said eye and form a lever for compressing the jaws.

In witness whereof I have hereunto set my hand this 7th day of December, 1914.

FRANK S. RICKER.

Witnesses:
A. C. JONES,
M. W. LINDSLEY.

Copies of this patent may be obtained for five cents each, by addressing the "Commissioner of Patents, Washington, D. C."